(12) United States Patent
Smart

(10) Patent No.: US 9,770,944 B2
(45) Date of Patent: Sep. 26, 2017

(54) REFLEX RIM FOR ENHANCED EFFICIENCY

(71) Applicant: ENVE Composites, LLC, Ogden, UT (US)

(72) Inventor: Simon Smart, Brackley (GB)

(73) Assignee: ENVE Composities, LLC, Ogden, UT (US)

( * ) Notice: Subject to any disclaimer, the term of this patent is extended or adjusted under 35 U.S.C. 154(b) by 127 days.

(21) Appl. No.: 14/633,260

(22) Filed: Feb. 27, 2015

(65) Prior Publication Data

US 2016/0250890 A1 Sep. 1, 2016

(51) Int. Cl.
B60B 21/02 (2006.01)
B60B 5/02 (2006.01)
B60B 1/00 (2006.01)

(52) U.S. Cl.
CPC .............. *B60B 21/025* (2013.01); *B60B 5/02* (2013.01); *B60B 21/02* (2013.01); *B60B 1/003* (2013.01); *B60B 2900/1216* (2013.01)

(58) Field of Classification Search
CPC ....... B60B 21/02; B60B 21/025; B60B 1/003; B60B 2900/1216; B60B 5/02
See application file for complete search history.

(56) References Cited

U.S. PATENT DOCUMENTS

| | | |
|---|---|---|
| 3,158,404 A | 11/1964 | Noakes |
| 4,919,490 A | 4/1990 | Hopkins et al. |
| 4,930,843 A | 6/1990 | Lewis |
| 5,061,013 A | 10/1991 | Hed et al. |
| 5,228,756 A | 7/1993 | Krampera |
| 5,246,275 A | 9/1993 | Arredondo, Jr. |
| 5,540,485 A | 7/1996 | Enders |
| D378,506 S | 3/1997 | Stolz et al. |

(Continued)

FOREIGN PATENT DOCUMENTS

| | | |
|---|---|---|
| DE | 101 32 090 A1 | 1/2003 |
| EP | 0 936 085 A2 | 8/1999 |

(Continued)

OTHER PUBLICATIONS

Chernyshenko. S. I. et al., "Trapped vortices and a favourable pressure gradient." J. Fluid Mech. (2003), pp. 235-255, vol. 482, Cambridge University Press (United Kingdom) 21 pages.

(Continued)

*Primary Examiner* — Kip T Kotter
*Assistant Examiner* — Scott A Browne
(74) *Attorney, Agent, or Firm* — Woodard, Emhardt, Moriarty, McNett & Henry LLP

(57) ABSTRACT

A bicycle rim is configured to reduce drag as well as enhance steering stability, such as in gusty and/or high cross wind conditions. The rim includes a leading edge where the rim interfaces with a tire, and a sidewall extends from the leading edge. The rim includes a spoke face where one or more spokes extend from the bicycle rim. A reflexed blend portion is disposed between the sidewall and the spoke face. The reflexed blend portion allows the sidewall to have increased camber which lowers pressure drag. At the same time, the reflexed blend portion allows the spoke face to have a larger radius so as to provide greater steering stability, such as in gusty and/or high cross wind conditions.

26 Claims, 6 Drawing Sheets

(56) References Cited

U.S. PATENT DOCUMENTS

| | | | |
|---|---|---|---|
| 5,893,614 A | 4/1999 | Dennis | |
| 5,915,796 A | 6/1999 | Beyer | |
| 5,975,645 A * | 11/1999 | Sargent | B60B 1/003 |
| | | | 301/55 |
| 6,017,048 A | 1/2000 | Fritschen | |
| 6,086,161 A * | 7/2000 | Luttgeharm | B60B 1/003 |
| | | | 301/104 |
| 6,193,322 B1 | 2/2001 | Corridori | |
| 6,991,298 B2 | 1/2006 | Ording et al. | |
| 7,114,785 B2 | 10/2006 | Ording et al. | |
| 8,757,733 B2 * | 6/2014 | Smart | B60B 21/025 |
| | | | 301/95.102 |
| 8,888,195 B1 * | 11/2014 | Hed | B60B 21/02 |
| | | | 301/95.101 |
| 9,135,730 B2 * | 9/2015 | Fang | G06T 11/203 |
| 2007/0200422 A1 | 8/2007 | Davis et al. | |
| 2009/0236902 A1 | 9/2009 | Zibkoff | |
| 2010/0225090 A1 * | 9/2010 | Cusack | B62K 3/04 |
| | | | 280/281.1 |
| 2013/0026815 A1 * | 1/2013 | Smart | B60B 21/025 |
| | | | 301/58 |
| 2013/0043717 A1 | 2/2013 | Poertner et al. | |
| 2013/0049441 A1 | 2/2013 | Smart | |
| 2014/0225423 A1 | 8/2014 | Meggiolan | |

FOREIGN PATENT DOCUMENTS

| | | | | |
|---|---|---|---|---|
| EP | 1 134 096 A2 | 9/2001 | | |
| EP | 1 404 534 B1 | 6/2002 | | |
| EP | 2 100 751 A1 | 9/2009 | | |
| GB | WO 2012069792 A2 * | 5/2012 | ........... | B60B 21/025 |
| GB | WO 2012069792 A3 * | 8/2012 | ........... | B60B 21/025 |
| RU | 2 096 188 C1 | 11/1997 | | |
| WO | WO 03/004290 A1 | 1/2003 | | |
| WO | WO 2011/133557 A1 | 10/2011 | | |
| WO | WO 2011133561 A1 * | 10/2011 | ............. | B60B 21/00 |

OTHER PUBLICATIONS

FFWD Wheels—New FFWD Technology—Darc (posted by FFWD on May 14, 2009). [retrieved Feb. 17, 2015]. 2 pages. Retrieved from the Internet <URL: http://www.ffwdwheels.com/news/archive/New-FFWD-Technology-Darc/>.
Harder, Paul et al., "Airfoil Development for the Trek Speed Concept Triathlon Bicycle", Apr. 24, 2010. 29 pages.
International Patent Application PCT/GB2011/001648 International Search Report and Written Opinion mailed Jun. 25, 2012, 20 pages.
International Patent Application PCT/GS2011/001648 Partial International Search Report mailed Mar. 22, 2012. 5 pages.
Iollo, Angelo et al., "Trapped vortex optimal control by suction and blowing at the wall," Eur. J. Mech. B—Fluids (2001), pp. 7-24, Editions, scientifiques et medicales Elsevier SAS. 18 pages.
International Patent Application PCT/US2016/018220 International Search Report mailed Jul. 1, 2016. 3 pages.
International Patent Application PCT/US2016/018220 Written Opinion mailed Jul. 1, 2016. 16 pages.

* cited by examiner

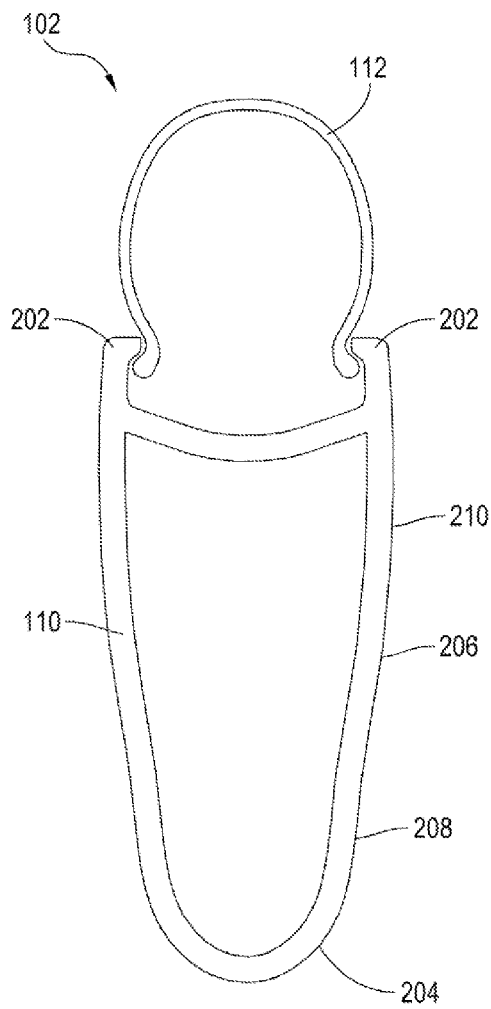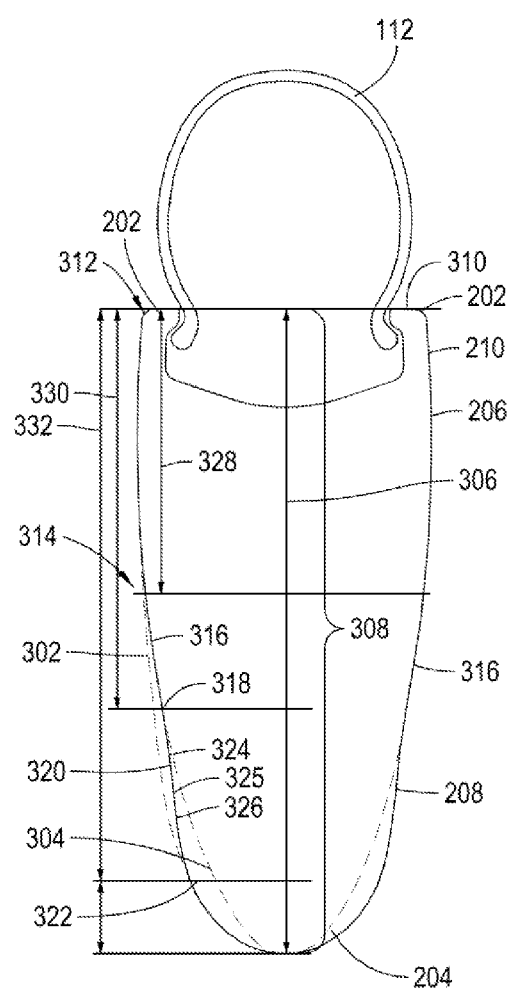

REFLEX RIM FOR ENHANCED EFFICIENCY

BACKGROUND

In competitive as well as even casual bicycle riding, there is always a desire to ride faster and better. One major factor that limits bicycle performance is drag. As a rider tries to ride faster, air drag become greater such that the rider has to expend increasingly more energy with each incremental improvement in speed. Moreover, the drag created by crosswinds can impact bicycle performance and handling. While there have been recent improvements in bicycle aerodynamics, international bicycle racing regulations limit the ability for designers to radically change the shape of various bicycle components. As a result, bicycle manufacturers are somewhat constrained in the ability to provide dramatic improvements in bicycle performance.

Thus, there is a need for improvement in this field.

SUMMARY

A unique bicycle rim has been developed to reduce drag as well as enhance steering stability. The rim includes a leading edge where the rim interfaces with a tire, and a sidewall extends from the leading edge. The rim includes a spoke face where one or more spokes extend from the bicycle rim. A reflexed blend portion is disposed between the sidewall and the spoke face. The reflexed blend portion allows the sidewall to have increased camber which reduces the pressure drag. At the same time, the reflexed blend portion allows the spoke face to have a larger radius so as to provide greater steering stability, such as in gusty and/or high cross wind conditions.

Aspect 1 concerns an article of manufacture, comprising a bicycle rim including a leading edge, a sidewall extending from the leading edge, a spoke face, a reflexed blend portion disposed between the sidewall and the spoke face, wherein the reflexed blend portion has a reflexed shape, and wherein the sidewall, the reflexed blend portion, and the spoke face have curvature acceleration (G3) continuity.

Aspect 2 concerns the article of aspect 1, wherein the sidewall further includes an extended curved section that is convexly shaped to reduce drag; the spoke face is convexly shaped; and the reflexed blend portion is at least in part concavely shaped to blend the extended curved section with the spoke face to allow the spoke face to have a larger spoke face radius than possible with the extended curved section.

Aspect 3 concerns the article of aspect 2, wherein the extended curved section increases camber of the sidewall to provide lower pressure drag.

Aspect 4 concerns the article of aspect 2, wherein the rim has a chord length that extends from the leading edge to an end of the spoke face; and the extended curved section starts at least 45% of the chord length from the leading edge.

Aspect 5 concerns the article of aspect 1, wherein the reflexed blend portion includes at least two inflection points.

Aspect 6 concerns the article of aspect 1, wherein the reflexed blend portion includes a concave blend portion extending from the sidewall, wherein the concave blend portion is concavely shaped; and a convex blend portion extending between the concave blend portion and the spoke face, wherein the convex blend portion is convexly shaped.

Aspect 7 concerns the article of aspect 6, wherein the reflexed blend portion includes a sidewall inflection point disposed between the sidewall and the concave blend portion; and a spoke face inflection point disposed between the concave blend portion and the convex blend portion.

Aspect 8 concerns the article of aspect 1, wherein the rim has a chord length that extends from the leading edge to an end of the spoke face; and the reflexed blend portion starts at least 65% of the chord length from the leading edge.

Aspect 9 concerns the article of aspect 1, wherein the rim has a chord length that extends from the leading edge to an end of the spoke face; and the spoke face starts at least 85% of the chord length from the leading edge.

Aspect 10 concerns the article of aspect 1, wherein the rim at the leading edge has a width of at least 25 mm.

Aspect 11 concerns the article of aspect 1, wherein the rim further includes a trip edge.

Aspect 12 concerns the article of aspect 11, wherein the trip edge is located along the reflexed blend portion.

Aspect 13 concerns the article of aspect 1, further comprising a bicycle wheel including the bicycle rim; one or more spokes extending from the spoke face; and a hub to which the spokes are secured.

Aspect 14 concerns the article of aspect 13, further comprising a tire engaging the leading edge of the rim.

Aspect 15 concerns the article of aspect 14, wherein the tire is a clincher tire having a width of at least 25 mm.

Aspect 16 concerns the article of aspect 1, wherein the sidewall and the reflexed blend portion have a maximum rate of change of curvature less than 0.045 mm/mm; and a maximum rate of change in the rate of change of curvature less than 0.0276 mm/mm2.

Aspect 17 concerns An article of manufacture, comprising a bicycle rim including a leading edge, a sidewall extending from the leading edge, a spoke face, a reflexed blend portion disposed between the sidewall and the spoke face, wherein the reflexed blend portion has a reflexed shape, and wherein the sidewall and the reflexed blend portion has a maximum rate of change of curvature less than 0.045 mm/mm, and a maximum rate of change in the rate of change of curvature less than 0.0276 mm/mm2.

Aspect 18 concerns the article of aspect 17, wherein the sidewall, the reflexed blend portion, and the spoke face have curvature acceleration (G3) continuity.

Aspect 19 concerns the article of aspect 17, wherein the sidewall further includes an extended curved section that is convexly shaped to reduce drag; the spoke face is convexly shaped; and the reflexed blend portion is at least in part concavely shaped to blend the extended curved section with the spoke face to allow the spoke face to have a larger spoke face radius than possible with the extended curved section.

Aspect 20 concerns the article of aspect 19, wherein the extended curved section increases camber of the sidewall to provide lower pressure drag.

Aspect 21 concerns the article of aspect 19, wherein the reflexed blend portion includes a concave blend portion extending from the extended curved section, wherein the concave blend portion is concavely shaped.

Aspect 22 concerns the article of aspect 21, wherein the reflexed blend portion includes a convex blend portion extending between the concave blend portion and the spoke face, wherein convex blend portion is convexly shaped.

Aspect 23 concerns the article of aspect 22, wherein the reflexed blend portion includes a sidewall inflection point disposed between the extended curved section and the concave blend portion; and a spoke face inflection point disposed between the concave blend portion and the convex blend portion.

Aspect 24 concerns the article of aspect 21, wherein the concave blend portion has a curvilinear length of at least 5.0 mm and at most 20.0 mm.

Aspect 25 concerns the article of aspect 21, wherein the concave blend portion has a curvilinear length of at least 7.5 mm and at most 13.0 mm.

Aspect 26 concerns the article of aspect 17, wherein the sidewall has a sidewall radius from 50 to 600 mm.

Aspect 27 concerns the article of aspect 17, wherein the spoke face has a radius of 2 mm or greater.

Aspect 28 concerns the article of aspect 17, wherein the rim further includes a trip edge disposed along the reflexed blend portion.

Aspect 29 concerns the article of any preceding aspect, wherein the sidewall, the reflexed blend portion, and the spoke face have curvature acceleration (G3) continuity.

Aspect 30 concerns the article of any preceding aspect, wherein the sidewall and the reflexed blend portion have a maximum rate of change of curvature less than 0.045 mm/mm; and a maximum rate of change in the rate of change of curvature less than 0.0276 mm/mm2.

Aspect 31 concerns the article of any preceding aspect, wherein the sidewall further includes an extended curved section that is convexly shaped to reduce drag; the spoke face is convexly shaped; and the reflexed blend portion is at least in part concavely shaped to blend the extended curved section with the spoke face to allow the spoke face to have a larger spoke face radius than possible with the extended curved section.

Aspect 32 concerns the article of any preceding aspect, wherein the extended curved section increases the camber of the sidewall to provide lower pressure drag.

Aspect 33 concerns the article of any preceding aspect, wherein the reflexed blend portion includes a concave blend portion extending from the sidewall, wherein the concave blend portion is concavely shaped.

Aspect 34 concerns the article of any preceding aspect, wherein the reflexed blend portion includes a convex blend portion extending between the concave blend portion and the spoke face, wherein convex blend portion is convexly shaped.

Aspect 35 concerns the article of any preceding aspect, wherein the reflexed blend portion includes a sidewall inflection point disposed between the sidewall and the concave blend portion; and a spoke face inflection point disposed between the concave blend portion and the convex blend portion.

Aspect 36 concerns the article of any preceding aspect, wherein the sidewall inflection point is disposed between the extended curved section and the concave blend portion.

Aspect 37 concerns the article of any preceding aspect, wherein the rim has a chord length that extends from the leading edge to an end of the spoke face; and the extended curved section starts at least 45% of the chord length from the leading edge.

Aspect 38 concerns the article of any preceding aspect, wherein the reflexed blend portion includes at least two inflection points.

Aspect 39 concerns the article of any preceding aspect, wherein the rim has a chord length that extends from the leading edge to an end of the spoke face; and the reflexed blend portion starts at least 65% of the chord length from the leading edge.

Aspect 40 concerns the article of any preceding aspect, wherein the rim has a chord length that extends from the leading edge to an end of the spoke face; and the spoke face starts at least 85% of the chord length from the leading edge.

Aspect 41 concerns the article of any preceding aspect, wherein the rim at the leading edge has a width of at least 25 mm.

Aspect 42 concerns the article of any preceding aspect, wherein the rim further includes a trip edge.

Aspect 43 concerns the article of any preceding aspect, wherein the trip edge is located along the reflexed blend portion.

Aspect 44 concerns the article of any preceding aspect, further comprising a bicycle wheel including the bicycle rim; one or more spokes extending from the spoke face; and a hub to which the spokes are secured.

Aspect 45 concerns the article of any preceding aspect, further comprising a tire engaging the leading edge of the rim.

Aspect 46 concerns the article of any preceding aspect, wherein the tire is a clincher tire having a width of at least 25 mm.

Aspect 47 concerns the article of any preceding aspect, wherein the concave blend portion has a curvilinear length of at least 5.0 mm and at most 20.0 mm.

Aspect 48 concerns the article of any preceding aspect, wherein the concave blend portion has a curvilinear length of at least 7.5 mm and at most 13.0 mm.

Aspect 49 concerns the article of any preceding aspect, wherein the sidewall has a sidewall radius from 50 to 600 mm.

Aspect 50 concerns the article of any preceding aspect, wherein the spoke face has a radius of 2 mm or greater.

Further forms, objects, features, aspects, benefits, advantages, and embodiments of the present invention will become apparent from a detailed description and drawings provided herewith.

BRIEF DESCRIPTION OF THE DRAWINGS

FIG. 2 is a cross-sectional view of a bicycle wheel for the FIG. 1 bicycle with a reflexed blend portion.

FIG. 3 shows cross-sectional views of various rim profiles including for the FIG. 2 wheel.

DESCRIPTION OF THE SELECTED EMBODIMENTS

Figure 1:
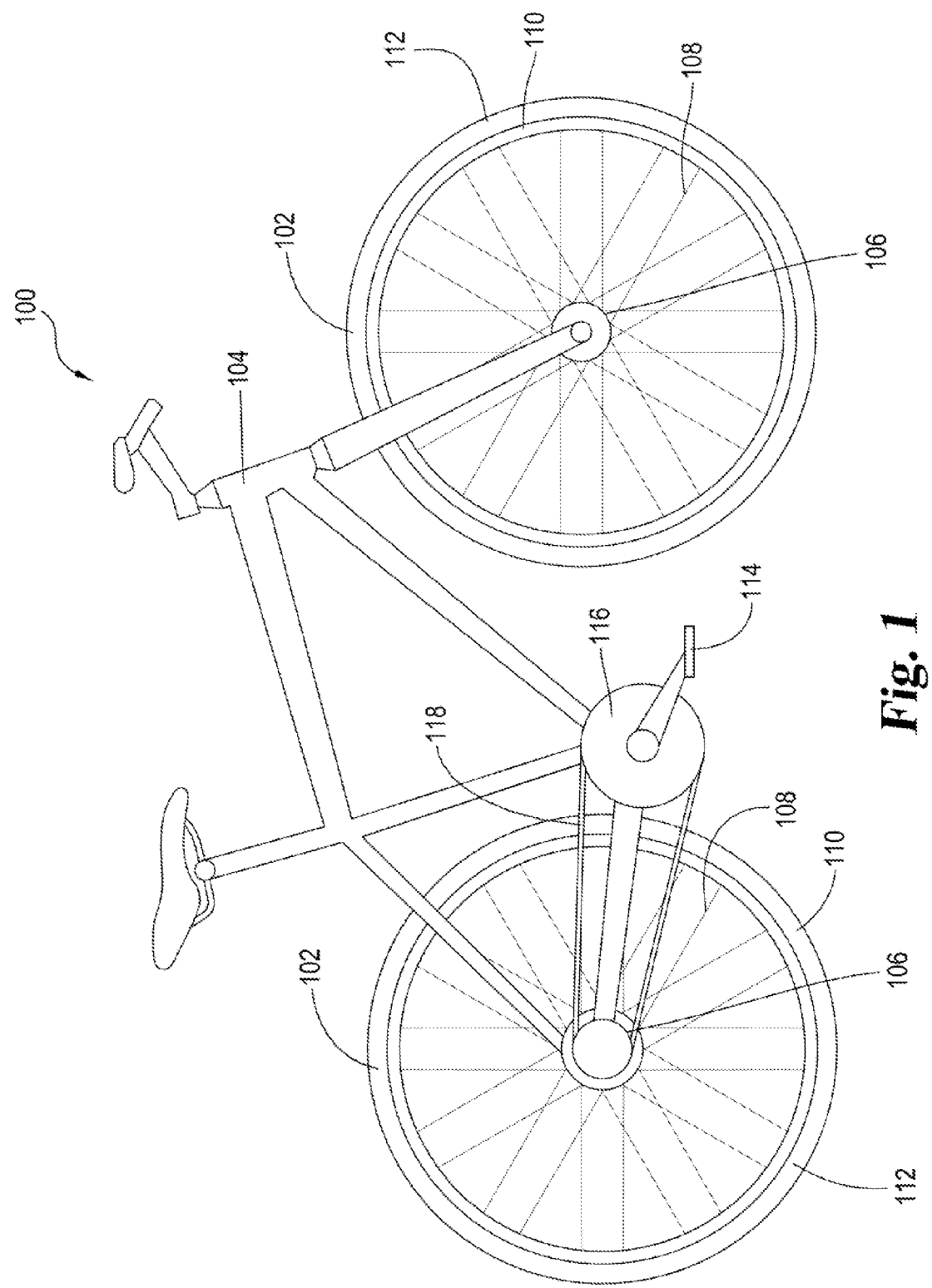
FIG. 1 is a side view of a bicycle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIG. 1 shows a side view of a bicycle 100 with bicycle wheels 102 that are attached to a bicycle frame 104. Each wheel 102 includes a wheel hub 106, one or more spokes 108, a rim 110, and a tire 112 that is secured to the outer radial periphery of the rim 110. It should be recognized that the hubs 106 via axles are rotatably coupled to the bicycle frame 104, such as through the fork and rear dropouts. The spokes 108 extend radially outward from the hub 106 in order to connect the rim 110 to the hub 106. As will be explained below, the rims 110 are shaped to enhance aerodynamics as well as improve stability of the wheel 102. Typically, the spokes 108 are under tension when secured between the hub 106 and the rim 110. A rider via one or more pedals 114 and a crank assembly 116 drive a chain or belt 118 that in turn propels the bicycle 100.

FIG. 2 shows a cross-sectional view of the wheel 102. As shown, the tire 112 is joined to the rim 110 at one or more leading edges 202. As shown, the leading edges 202 in the illustrated example are arranged in an opposing manner. The rim 110 further includes a spoke face 204 where the spokes 108 are attached to the rim 110. Between the leading edge 202 and the spoke face 204, the rim 110 has two opposing sidewalls 206 that extend from the leading edges 202 to the spoke face 204. The sidewalls 206 have a unique shape that lowers pressure drag as well as improves stability of the rim 110. As can be seen, each sidewall 206 of the rim 110 incorporates a reflexed blend portion or section 208 that enhances the aerodynamics and stability of the rim 110. Each sidewall 206 further includes an arched portion or section 210. The reflexed blend portion 208 of the sidewall 206 provides a smooth transition from the arched portion 210 of the sidewall 206 to the spoke face 204. The reflexed blend portion 208 allows the spoke face 204 to have a larger spoke face radius which in turn enhances steering stability when riding. In other words, the reflexed blend portion 208 provides a continuous curvature surface that is used to blend the arched portion 210 of the sidewall 206 with increased camber into a larger spoke face radius. In one example, the spoke face 204 has a minimum radius of 2 mm. In other words, the spoke face 204 has a radius of 2 mm or greater. The sidewalls 206 in one form have a sidewall radius from 50 to 600 mm.

To further illustrate the unique shape of the rim 110, FIG. 3 shows the cross-sectional shape of the rim 110 in comparison to other rim profiles. Dashed line 302 depicts the cross-sectional shape of one example of the inventive rim design described in U.S. Pat. No. 8,757,733 to Smart. Since around 2010, tire developers have progressively created wider tires, particularly wider clincher tires, so as to have a more favorable shape for reducing drag when the airflow passes over the tire. Moreover, due to the introduction of disc brakes on road bikes, there is no longer a brake shoe limiting the width of the rim such that much wider rims are being considered that were not previously practical. With these wider tire designs, it is desirable to increase the camber of the sidewall, thereby leading to a lower sidewall curvature and smaller spoke face radius as is indicated by dashed line 304 in FIG. 3.

Figure 4:
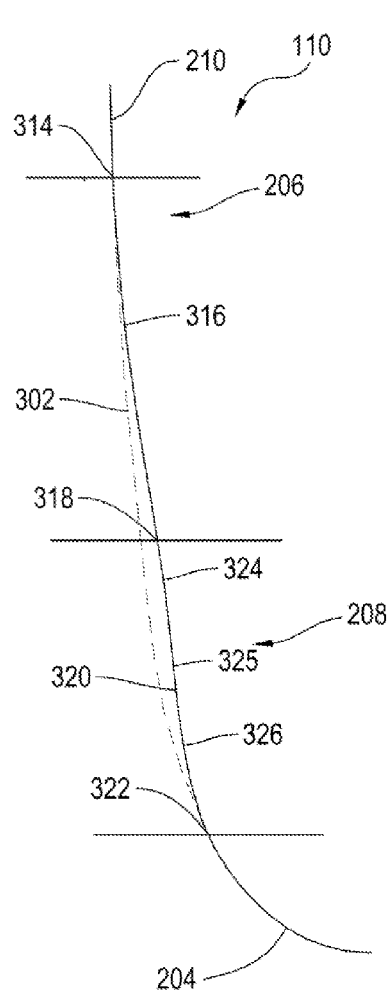
FIG. 4 shows an enlarged view of the FIG. 2 wheel in comparison with one of the rim profiles shown in FIG. 3.
Figure 5:
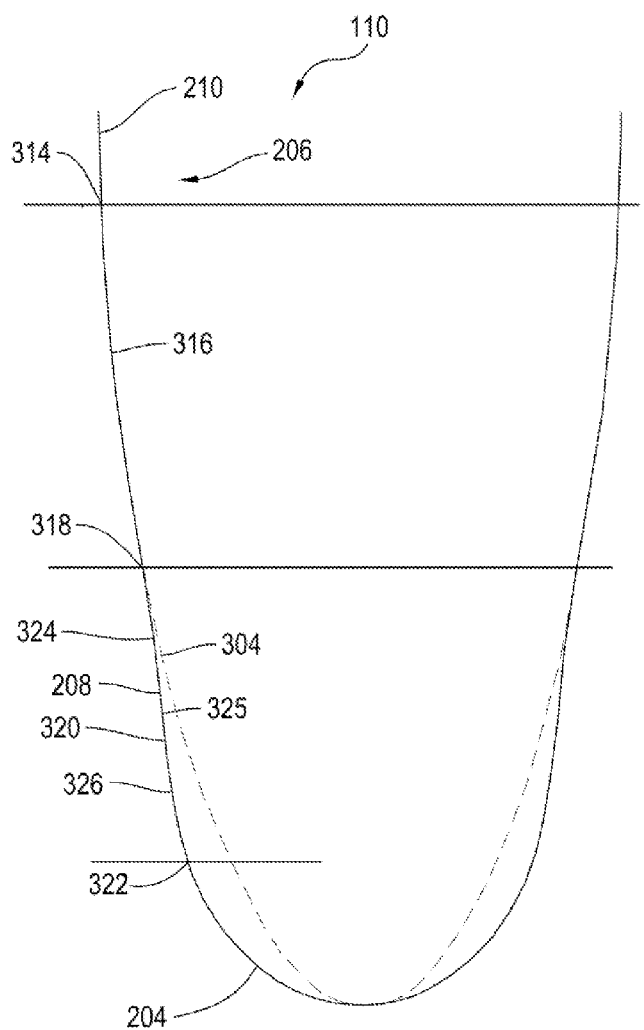
FIG. 5 shows an enlarged view of the FIG. 2 wheel in comparison with another rim profile shown in FIG. 3.

To help depict the relative locations of where various features are located along the rim 110, a chord 306 with a chord length 308 is depicted in FIG. 3. As shown, the chord 306 extends from the leading edge 202 to the end of the spoke face 204 of the rim 110. In the depicted example, the leading edge 202 has a chamfer or bevel 310 that transitions into the sidewall 206. At the end of the chamfer 310, the sidewall 206 has an arched portion starting point 312 that represents where the arched portion 210 of the sidewall 206 begins. FIGS. 4 and 5 are enlarged views of the rim 110 that show a comparison of the outer shape of the rim 110 to the cross-sectional shapes of the rims represented by dashed lines 302 and 304, respectively. Looking at FIGS. 3 and 4, the arched portion 210 of the sidewall 206 at point 314 deviates from the rim shape represented by dashed line 302 to form an extended curved section or surface 316 of the arched portion 210. As can be seen, the rim 302 has generally less curvature or camber than the rim 110 at the extended curved section 316 in order to transition into the relatively wide spoke face 204. However, the airflow from the tire 112 starts to separate from the surface of the rim 110 generally at point 314. By having increased curvature or camber at the extended curved section 316 with the illustrated design, the airflow from the tire 112 can stay attached longer to the sidewall 206 of the rim 110 so as to create a longer distance (and greater time) upon which pressure recovery can occur.

As can be seen in FIGS. 3 and 5, the curvature of the extended curved section 316 generally coincides with the curvature of rim 304. However, as noted before, this increased curvature in the design of rim 304 creates a smaller spoke face radius. The smaller spoke face of the rim 304 with increased sidewall curvature inhibits steering stability when riding. It should be recognized that this steering stability issue is typically (but not always) specific to the front wheel such that in some examples the front rear wheels can have spoke face radii that are different. For instance, the minimum spoke face radius for the front wheel (used for steering) in one example is significantly greater than 2 mm, and the minimum spoke face radius for the rear wheel is as small as 2 mm. In other examples, the front and rear wheels have the same dimensions such that the minimum spoke face radii for both wheels is generally the same.

At a sidewall inflection point or flex point 318, the reflexed blend portion 208 of the rim 110 starts by diverging or curving away from the curvature profile of rim 304 so to form a blending portion or section 320 that blends into the larger spoke face 204 at spoke face blend point 322 where the reflexed blend portion 208 ends. Looking at FIGS. 3, 4, and 5, the blending portion 320 that forms the reflexed blend portion 208 includes a concave blend portion 324 starting at the sidewall inflection point 318, a spoke face inflection (flex) point 325, and a convex blend portion 326 transitioning between the concave blend portion 324 and the spoke face 204 at the blend point 322. As can be seen, the concave blend portion 324 has a concave shape that curves away from the profile of rim 304, and the convex blend portion 326 has a convex shape that blends into the convexly shaped spoke face 204. The spoke face inflection point 325 joins or transitions the concave blend portion 324 with the convex blend portion 326. With the reflexed blend portion 208, the rim 110 has an overall shape that is convexly curved starting at the leading edge 202, then is concavely curved at the blending portion 320, and convexly curved again at the spoke face 204. As shown, each sidewall 206 of the rim 110 has two inflection points (i.e., the sidewall 318 and spoke face 325 inflection points) located within or around the reflexed blended portion 208. In the reflexed blended portion 208, the inflection points 318, 325 bookend the concave blend portion 324. In one example, the concave blend portion 324 has a curvilinear distance or length of at least 5.0 mm and at most 20.0 mm (or between 5.0 and 20.0 mm), and in another example, the concave blend portion 324 has a curvilinear length of at least 7.5 mm and at most 13.0 mm.

The locations of the various features of the rim 110 vary depending on the size of the rim 110. In one example, a distance 328 between the leading edge 202 and the point 314 where the extended curved section 316 starts is generally at least 45% of the chord length 308 of the rim 110. A distance 330 in this example from the leading edge 202 to the sidewall inflection point 318 is generally at least 65% of the chord length 308, and a distance 332 from the leading edge 202 to the blend point 322 is generally at least 85% of the chord length 308. It should be recognized that these relative distances can be different in other examples. For instance, the distance 328 can be at least 50% of the chord length 308 in other examples.

Figure 6:
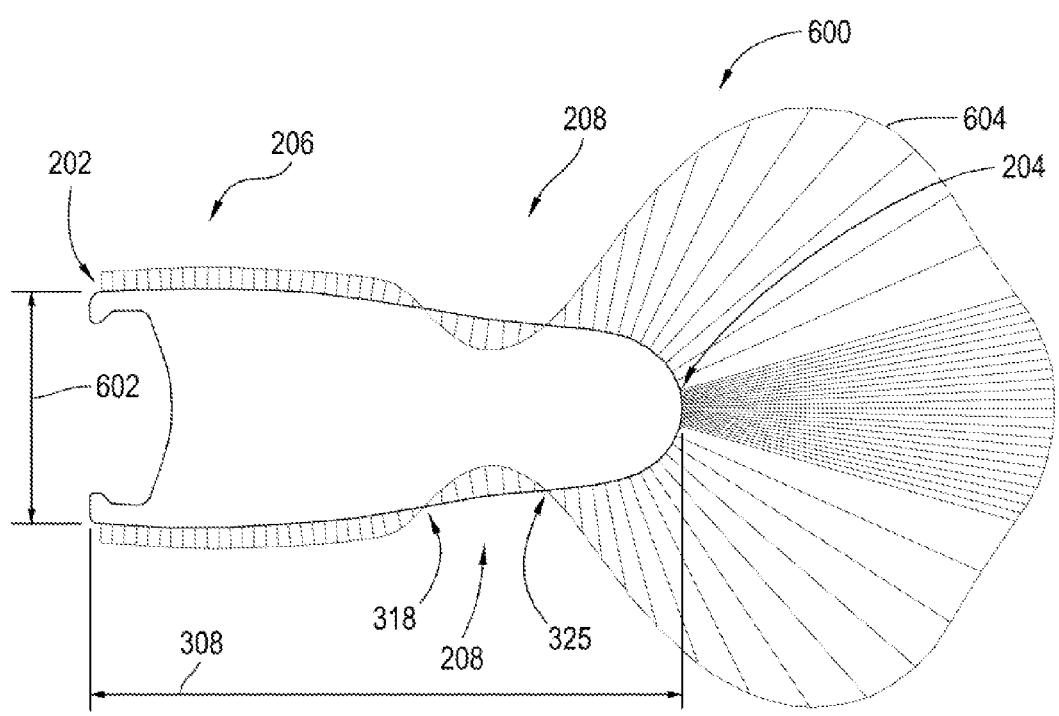
FIG. 6 shows a curvature comb of a 65 mm type rim with a reflexed blend portion.

FIG. 6 represents the curvature of the surfaces in one example rim 600 having specified dimensions. In particular, the rim 600 in FIG. 6 is one example of a 65 mm rim that incorporates the above discussed reflexed portion feature. In the illustrated example, the rim 600 has a chord length 308 of 65.8 mm and a width 602 at the leading edge 202 of 25.9 mm. FIG. 6 shows a graphical aid tool commonly called a "curvature comb" or "hedgehog/porcupine curve" 604. With the curvature comb 604, the length of the lines (splines or spokes) radiating from the surface of the rim 600 represent the curvature (K). It should be noted that the length of these curvature (K) lines and the density of these lines are typically based on an arbitrary scale that best shows the curvature (K). The change of length between each of these lines provide a visual aid for evaluating the change in curvature ($\partial c$) as well as the rate of change (or acceleration) in the change of curvature ($\partial K'$) along the length of the rim. In one form, the sidewall 206 and the reflexed blend portion 208 have a maximum rate of change of curvature ($\partial K$) less than 0.045 mm/mm, and a maximum rate of change in the rate of change of curvature ($\partial K'$) less than 0.0276 mm/mm$^2$. Alternatively or additionally, all or part of the spoke face 204 has a maximum rate of change of curvature ($\partial K$) less than 0.045 mm/mm, and a maximum rate of change in the rate of change of curvature ($\partial K'$) less than 0.0276 mm/mm$^2$.

Continuity between surfaces (i.e., how smoothly they connect to one another) can be characterized based on a number of different levels or classes of continuity. Positional or touching continuity, commonly referred to as G0 continuity, occurs whenever the end positions of two curves or surfaces touch. With G0 continuity, the curves or surfaces can meet at an angle, thereby having sharp corners or edges. Tangential or G1 continuity requires the end vectors of the curves or surfaces to be parallel where they meet, thereby ruling out sharp edges. With G1 continuity, the curves or surfaces share a common tangent direction at the location where two curves or surfaces meet. To put it another way, G1 continuity means that the two curves not only touch, but they go the same direction at the point where they touch G2 or curvature continuity further requires the end vectors to be of the same length and rate of length change. In other words, G2 continuity additionally requires that the curves (or surfaces) not only go the same direction when they meet, but also have the same radius (R) or curvature (K) at that point where they meet. G3 or curvature acceleration continuity requires an even a higher degree of continuity than G2 by adding another requirement to the continuity, planar acceleration. Curves that are G3 continuous touch (G0) go the same direction (G1), have the same radius or curvature (G2), and that radius (R) or curvature (K) is accelerating at the same rate where the curves or surfaces meet.

Looking at the curvature comb 604 in FIG. 6, the surface of the rim 600 from the leading edges 202 to the spoke face has G3 continuity. As shown, the rim 600 from the leading edge 202 is convexly curved along the sidewall 206. Starting around the sidewall inflection point 318, the surface of the rim 600 becomes concavely curved, as is indicated by the curvature comb 604 gradually extending inside the rim 600 (i.e., in the opposite direction), so as to form or start the reflexed blend portion 208. Around the spoke face inflection point 325, the surface of the rim 600 becomes convexly curved again so as to blend into the convexly curved spoke face 204. Even though the rim 600 is concavely curved in the reflexed blend portion 208, as can be seen, the transitions from the convexly curved portions on both sides of the reflexed blend portion 208 are smooth, gradual, and continuous enough to still have G3 continuity.

As alluded to before, an inflection point or flex point is a point on a curve at which the curve changes from being concave (concave downward) to convex (concave upward), or vice versa. In calculus, an inflection point can occur where the second derivative of a function equals zero the second derivative of the function on opposite sides of the point have opposite signs. As mentioned before, the rim 110 illustrated in the drawings has at least two inflection points 318, 325 in the reflexed blended portion 208 that allow the sidewall 206 to have the spoke face 204 with a larger radius while at the same time have the extended curved section 316 so as to lengthen flow attachment. The inflection points 318, 325 allow the sidewall 206 to transition from the convexly shaped extended curved section 316 to the convexly shaped spoke face 204 via concave blend portion 324. It should be recognized that the sidewalls 206 can include more than two inflection points or other features. For instance, the sidewalls can further include undulation points where the curvature vanishes but does not change in sign or hyperflex.

Table 1 below provides curvature and gradient data for one variation of the rim 600 illustrated in FIG. 6. The rim 600 in Table 1 is a 65 mm type rim. As will be seen in Table 1 as well as in the other subsequent tables, there are some fluctuations in the calculated gradient ($\partial K$) and gradient derivative values ($\partial K'$) (e.g., fluctuations between positive and negative values at adjacent measurement locations) due to minor measurement variations and/or the very small values involved.

TABLE 1

| Sample (Needle No.) | Total Curvilinear Distance (mm) | Curvilinear Distance Spacing (L) (mm) | Radius of Curvature (mm) | Curvature (K) | Gradient ($\partial K$) (mm/mm) | Gradient Derivative ($\partial K'$) (mm/mm$^2$) |
|---|---|---|---|---|---|---|
| 1 | 0.0000 | 0.0000 | 137.027 | 0.0072978 | | |
| 2 | 1.0933 | 1.0933 | 136.368 | 0.0073331 | −0.000032256 | |
| 3 | 2.1867 | 1.0933 | 135.710 | 0.0073687 | 0.000032520 | 0.000059246 |
| 4 | 3.2800 | 1.0933 | 135.067 | 0.0074037 | 0.000032085 | −0.000000398 |
| 5 | 4.3733 | 1.0933 | 134.476 | 0.0074363 | 0.000029761 | −0.000002126 |
| 6 | 5.4667 | 1.0933 | 133.814 | 0.0074731 | 0.000033648 | 0.000003556 |

TABLE 1-continued

| Sample (Needle No.) | Total Curvilinear Distance (mm) | Curvilinear Distance Spacing (L) (mm) | Radius of Curvature (mm) | Curvature (K) | Gradient (∂K) (mm/mm) | Gradient Derivative (∂K') (mm/mm$^2$) |
|---|---|---|---|---|---|---|
| 7 | 6.5600 | 1.0933 | 133.118 | 0.0075121 | 0.000035737 | 0.000001911 |
| 8 | 7.6533 | 1.0933 | 132.435 | 0.0075509 | 0.000035435 | −0.000000277 |
| 9 | 8.7467 | 1.0933 | 131.854 | 0.0075841 | 0.000030432 | −0.000004576 |
| 10 | 9.8400 | 1.0933 | 131.223 | 0.0076206 | 0.000033356 | 0.000002675 |
| 11 | 10.9333 | 1.0933 | 130.706 | 0.0076508 | 0.000027570 | −0.000005292 |
| 12 | 12.0267 | 1.0933 | 129.995 | 0.0076926 | 0.000038273 | 0.000009790 |
| 13 | 13.1200 | 1.0933 | 129.392 | 0.0077285 | 0.000032789 | −0.000005016 |
| 14 | 14.2133 | 1.0933 | 128.791 | 0.0077645 | 0.000032986 | 0.000000180 |
| 15 | 15.3067 | 1.0933 | 128.110 | 0.0078058 | 0.000037751 | 0.000004358 |
| 16 | 16.4000 | 1.0933 | 127.628 | 0.0078353 | 0.000026963 | −0.000009867 |
| 17 | 17.4933 | 1.0933 | 127.109 | 0.0078673 | 0.000029261 | 0.000002102 |
| 18 | 18.5867 | 1.0933 | 126.403 | 0.0079112 | 0.000040190 | 0.000009996 |
| 19 | 19.6800 | 1.0933 | 125.995 | 0.0079368 | 0.000023431 | −0.000015328 |
| 20 | 20.7733 | 1.0933 | 125.379 | 0.0079758 | 0.000035666 | 0.000011190 |
| 21 | 21.8667 | 1.0933 | 124.917 | 0.0080053 | 0.000026980 | −0.000007944 |
| 22 | 22.9600 | 1.0933 | 124.408 | 0.0080381 | 0.000029957 | 0.000002723 |
| 23 | 24.0533 | 1.0933 | 123.916 | 0.0080700 | 0.000029190 | −0.000000701 |
| 24 | 25.1467 | 1.0933 | 123.433 | 0.0081016 | 0.000028883 | −0.000000281 |
| 25 | 26.2400 | 1.0933 | 122.961 | 0.0081327 | 0.000028444 | −0.000000401 |

Table 2 below provides curvature and gradient data for another variation of the rim 600 illustrated in FIG. 6. Like Table 1, the rim 600 in Table 2 is a 65 mm type rim, but as indicated, the spacing (L) between measurement or sample points is larger. In Table 2, the concave blend portion 324 of the reflexed portion 208 generally extends between sample points 4 and 12. In one form, the concave blend portion 324 has a curvilinear distance of no more than 13.0 mm.

TABLE 2

| Sample (Needle No.) | Total Curvilinear Distance (mm) | Curvilinear Distance Spacing (L) (mm) | Radius of Curvature (mm) | Curvature (K) | Gradient (∂K) (mm/mm) | Gradient Derivative (∂K') (mm/mm$^2$) |
|---|---|---|---|---|---|---|
| 1 | 0.0000 | 0.0000 | 122.961 | 0.0081327 | | |
| 2 | 1.7229 | 1.7229 | 149.209 | 0.0067020 | 0.000830366 | |
| 3 | 3.4458 | 1.7229 | 306.899 | 0.0032584 | −0.001998708 | −0.001642026 |
| 4 | 5.1688 | 1.7229 | 1012.221 | 0.0009879 | −0.001317809 | 0.000395202 |
| 5 | 6.8917 | 1.7229 | 194.988 | 0.0051285 | 0.002403247 | 0.002159742 |
| 6 | 8.6146 | 1.7229 | 119.278 | 0.0083838 | 0.001889386 | −0.000298250 |
| 7 | 10.3375 | 1.7229 | 95.514 | 0.0104697 | 0.001210676 | −0.000393931 |
| 8 | 12.0604 | 1.7229 | 90.467 | 0.0110538 | 0.000339009 | −0.000505925 |
| 9 | 13.7833 | 1.7229 | 98.958 | 0.0101053 | −0.000550495 | −0.000516278 |
| 10 | 15.5063 | 1.7229 | 129.383 | 0.0077290 | −0.001379235 | −0.000481010 |
| 11 | 17.2292 | 1.7229 | 275.149 | 0.0036344 | −0.002376549 | −0.000578852 |
| 12 | 18.9521 | 1.7229 | 639.242 | 0.0015644 | −0.001201475 | 0.000682026 |
| 13 | 20.6750 | 1.7229 | 119.960 | 0.0083361 | 0.003930404 | 0.002978600 |
| 14 | 22.3979 | 1.7229 | 57.390 | 0.0174246 | 0.005275082 | 0.000780466 |
| 15 | 24.1208 | 1.7229 | 35.711 | 0.0280026 | 0.006139553 | 0.000501749 |
| 16 | 25.8438 | 1.7229 | 23.739 | 0.0421248 | 0.008196680 | 0.001193980 |
| 17 | 27.5667 | 1.7229 | 17.163 | 0.0582649 | 0.009367893 | 0.000679785 |
| 18 | 29.2896 | 1.7229 | 13.254 | 0.0754489 | 0.009973813 | 0.000351683 |
| 19 | 31.0125 | 1.7229 | 10.574 | 0.0945716 | 0.011099010 | 0.000653077 |
| 20 | 32.7354 | 1.7229 | 9.215 | 0.1085187 | 0.008095069 | −0.001743521 |
| 21 | 34.4583 | 1.7229 | 8.465 | 0.1181335 | 0.005580520 | −0.001459472 |
| 22 | 36.1813 | 1.7229 | 8.165 | 0.1224740 | 0.002519265 | −0.001776787 |
| 23 | 37.9042 | 1.7229 | 8.112 | 0.1232742 | 0.000464438 | −0.001192645 |
| 24 | 39.6271 | 1.7229 | 8.041 | 0.1243626 | 0.000631766 | 0.000097119 |
| 25 | 41.3500 | 1.7229 | 7.663 | 0.1304972 | 0.003560563 | 0.001699906 |

Figure 7:
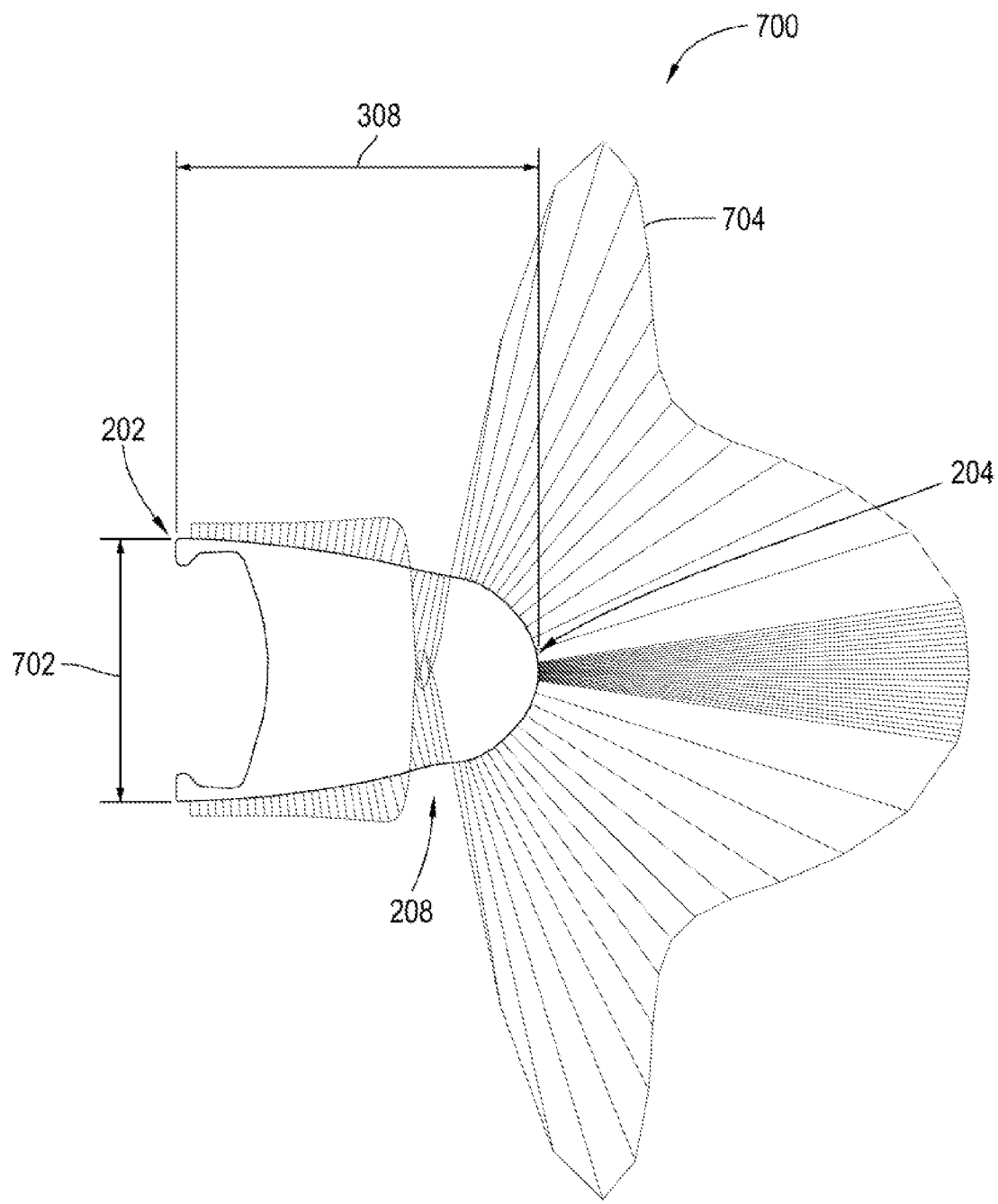
FIG. 7 shows a curvature comb of a 35 mm type rim with a reflexed blend portion.

FIG. 7 depicts the curvature of the surfaces in another example rim 700 that is a 35 mm type rim with the reflexed portion feature. In one form, the rim 700 has a chord length 308 of about 35.0 mm and a width 702 at the leading edge 202 of about 25.5 mm. The rim 700 in FIG. 7 has a curvature comb 704 that shows the relative curvature of the surface of the rim 700. While somewhat compressed due to the reduced chord length 308, the curvature comb 704 in FIG. 7 shows the rim to have G3 continuity. At the reflexed blend portion 208, the rim 700 is concavely curved. At both ends of the reflexed blend portion 208, the outer surface of the rim 700 gradually and smoothly transitions from being convexly curved to being concavely curved.

Table 3 below provides curvature and gradient data for one variation of the rim 700 illustrated in FIG. 7.

TABLE 3

| Sample (Needle No.) | Total Curvilinear Distance (mm) | Curvilinear Distance Spacing (L) (mm) | Radius of Curvature (mm) | Curvature (K) | Gradient (∂K) (mm/mm) | Gradient Derivative (∂K') (mm/mm²) |
|---|---|---|---|---|---|---|
| 1  | 0.0000  | 0.0000 | 201.173 | 0.0049708 |  |  |
| 2  | 0.5433  | 0.5433 | 226.249 | 0.0044199 | 0.001013994 |  |
| 3  | 1.0867  | 0.5433 | 216.010 | 0.0046294 | 0.000385594 | −0.001156564 |
| 4  | 1.6300  | 0.5433 | 205.998 | 0.0048544 | 0.000414112 | 0.000052486 |
| 5  | 2.1733  | 0.5433 | 195.853 | 0.0051059 | 0.000462799 | 0.000089608 |
| 6  | 2.7167  | 0.5433 | 187.696 | 0.0053278 | 0.000408394 | −0.000100133 |
| 7  | 3.2600  | 0.5433 | 179.250 | 0.0055788 | 0.000462030 | 0.000098718 |
| 8  | 3.8033  | 0.5433 | 170.635 | 0.0058605 | 0.000518396 | 0.000103740 |
| 9  | 4.3467  | 0.5433 | 162.835 | 0.0061412 | 0.000516669 | −0.000003179 |
| 10 | 4.8900  | 0.5433 | 155.264 | 0.0064406 | 0.000551148 | 0.000063459 |
| 11 | 5.4333  | 0.5433 | 148.452 | 0.0067362 | 0.000543941 | −0.000013265 |
| 12 | 5.9767  | 0.5433 | 141.403 | 0.0070720 | 0.000618040 | 0.000136379 |
| 13 | 6.5200  | 0.5433 | 134.341 | 0.0074437 | 0.000684217 | 0.000121799 |
| 14 | 7.0633  | 0.5433 | 128.200 | 0.0078003 | 0.000656260 | −0.000051455 |
| 15 | 7.6067  | 0.5433 | 121.472 | 0.0082323 | 0.000795162 | 0.000255647 |
| 16 | 8.1500  | 0.5433 | 115.551 | 0.0086542 | 0.000776388 | −0.000034553 |
| 17 | 8.6933  | 0.5433 | 109.702 | 0.0091156 | 0.000849233 | 0.000134071 |
| 18 | 9.2367  | 0.5433 | 104.147 | 0.0096018 | 0.000894863 | 0.000083980 |
| 19 | 9.7800  | 0.5433 |  98.558 | 0.0101463 | 0.001002142 | 0.000197446 |
| 20 | 10.3233 | 0.5433 |  92.901 | 0.0107641 | 0.001137123 | 0.000248432 |
| 21 | 10.8667 | 0.5433 |  88.078 | 0.0113536 | 0.001084833 | −0.000096239 |
| 22 | 11.4100 | 0.5433 |  82.936 | 0.0120575 | 0.001295553 | 0.000387827 |
| 23 | 11.9533 | 0.5433 |  77.707 | 0.0128689 | 0.001493307 | 0.000363964 |
| 24 | 12.4967 | 0.5433 |  73.513 | 0.0136030 | 0.001351256 | −0.000261442 |
| 25 | 13.0400 | 0.5433 |  68.910 | 0.0145117 | 0.001672354 | 0.000590977 |

Table 4 below provides curvature and gradient data for another variation of the rim 700 illustrated in FIG. 7. Again, the rim in FIG. 7 is a 35 mm type rim. In Table 4, the concave blend portion 324 of the reflexed portion 208 generally extends between sample points 4 and 11. In one form, the concave blend portion 324 has a curvilinear distance of at least 7.5 mm.

TABLE 4

| Sample (Needle No.) | Total Curvilinear Distance (mm) | Curvilinear Distance Spacing (L) (mm) | Radius of Curvature (mm) | Curvature (K) | Gradient (∂K) (mm/mm) | Gradient Derivative (∂K') (mm/mm²) |
|---|---|---|---|---|---|---|
| 1  | 0.0000  | 0.0000 |  68.910 | 0.0145117 |  |  |
| 2  | 1.0166  | 1.0166 |  76.649 | 0.0130465 | 0.001441290 |  |
| 3  | 2.0332  | 1.0166 | 114.530 | 0.0087313 | −0.004244738 | −0.005593250 |
| 4  | 3.0498  | 1.0166 | 418.818 | 0.0023877 | −0.006240156 | −0.001962859 |
| 5  | 4.0664  | 1.0166 | 185.078 | 0.0054031 | 0.002966253 | 0.009056189 |
| 6  | 5.0829  | 1.0166 |  64.994 | 0.0153860 | 0.009820019 | 0.006741934 |
| 7  | 6.0995  | 1.0166 |  38.916 | 0.0256964 | 0.010142104 | 0.000316830 |
| 8  | 7.1161  | 1.0166 |  27.607 | 0.0362227 | 0.010354569 | 0.000208998 |
| 9  | 8.1327  | 1.0166 |  25.745 | 0.0388425 | 0.002577050 | −0.007650615 |
| 10 | 9.1493  | 1.0166 |  42.801 | 0.0233639 | −0.015225992 | −0.017512553 |
| 11 | 10.1659 | 1.0166 |  58.080 | 0.0172176 | −0.006046021 | 0.009030183 |
| 12 | 11.1825 | 1.0166 |  13.110 | 0.0762777 | 0.058096347 | 0.063095766 |
| 13 | 12.1991 | 1.0166 |   7.691 | 0.1300221 | 0.052867513 | −0.005143515 |
| 14 | 13.2156 | 1.0166 |   6.735 | 0.1484781 | 0.018154852 | −0.034146260 |
| 15 | 14.2322 | 1.0166 |   7.078 | 0.1412828 | −0.007077847 | −0.024820982 |
| 16 | 15.2488 | 1.0166 |   8.302 | 0.1204529 | −0.020490066 | −0.013193374 |
| 17 | 16.2654 | 1.0166 |   9.631 | 0.1038314 | −0.016350314 | 0.004072204 |
| 18 | 17.2820 | 1.0166 |  10.972 | 0.0911411 | −0.012483226 | 0.003803990 |
| 19 | 18.2986 | 1.0166 |  11.847 | 0.0844096 | −0.006621694 | 0.005765890 |
| 20 | 19.3152 | 1.0166 |  11.915 | 0.0839278 | −0.000473873 | 0.006047508 |
| 21 | 20.3318 | 1.0166 |  11.300 | 0.0884956 | 0.004493222 | 0.004886047 |
| 22 | 21.3483 | 1.0166 |  10.156 | 0.0984640 | 0.009805734 | 0.005225829 |
| 23 | 22.3649 | 1.0166 |   9.052 | 0.1104728 | 0.011812915 | 0.001974430 |
| 24 | 23.3815 | 1.0166 |   7.883 | 0.1268553 | 0.016115125 | 0.004232012 |
| 25 | 24.3981 | 1.0166 |   7.348 | 0.1360915 | 0.009085490 | −0.006914934 |

Figure 8:
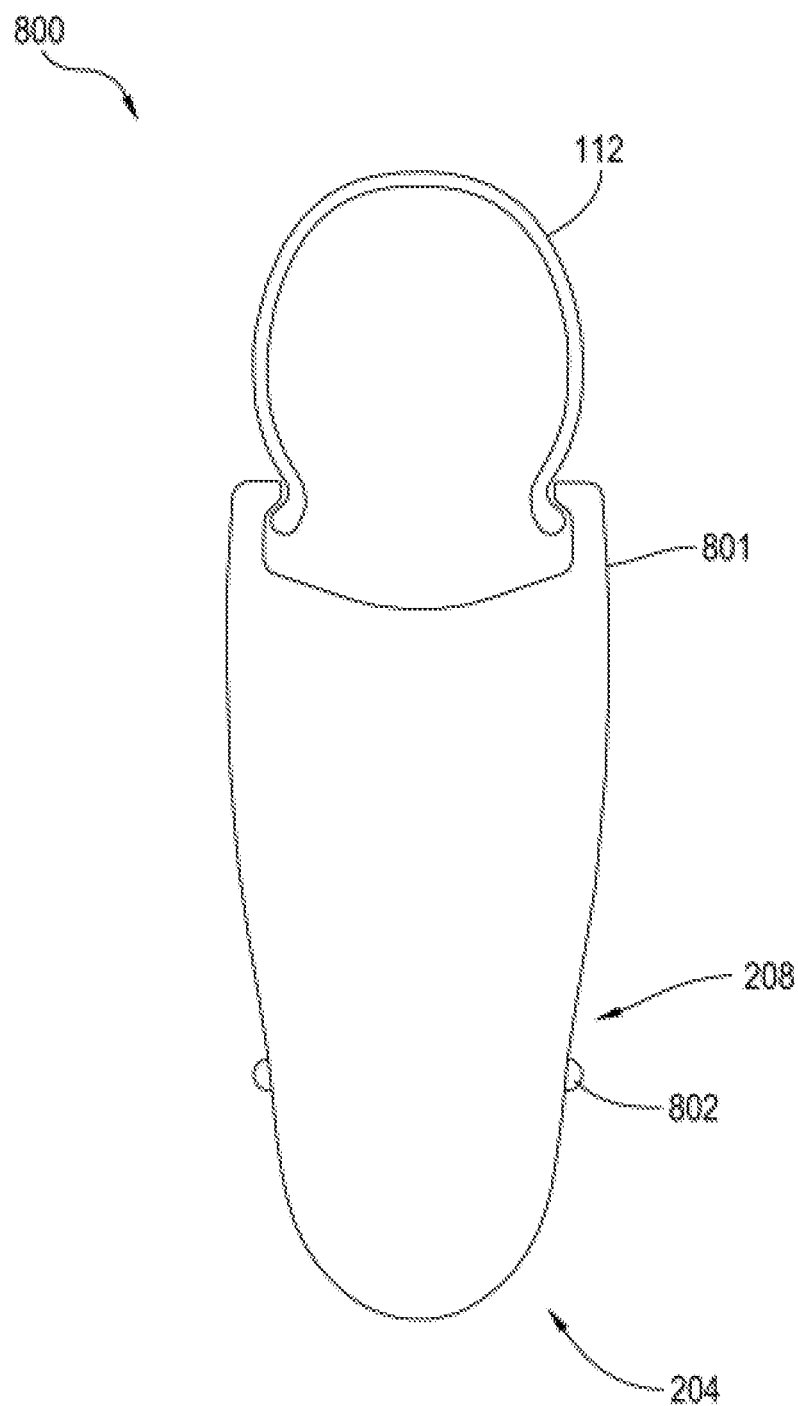
FIG. 8 is a cross-sectional view of a wheel with a reflexed blend portion incorporating a trip edge.

FIG. 8 shows a profile of another example of a wheel system 800 that includes a rim 801 and the tire 112 of the type described before. In this particular example, the rim 801 at the reflexed blend portion 208 includes one or more trip edges 802. While not certain, it is thought that the trip edges 802 along the surface of the rim 801 control the airflow separation, and the trip edges 802 in turn enhance stability of the airflow travelling around the spoke face 204 at the back of the wheel system 800. In the illustrated example, the trip edges 802 are curved, but it should be recognized that the trip edges 802 in other examples can be shaped differently than is shown and can be located at other positions along the rim 801.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Bicycle" is used in the broader or more generic sense to generally refer to a human powered land vehicle that includes one or more wheels. The term "bicycle" can refer to a vehicle having two wheels, but it also refers to vehicles having one wheel (i.e., a unicycle), three wheels (i.e., a tricycle), or even more wheels.

"Camber" generally refers to the degree of convexity, arching, and/or curvature of a surface. While for aerodynamics in aircraft, camber generally refers to the asymmetry between the surfaces of an airfoil, this particular narrow interpretation of camber is not intended to be applied to the rims described, illustrated, and claimed herein because most (but not all) of the airfoil shapes described and/or illustrated herein are considered symmetric airfoils, and thus, have no camber in this narrower sense for aircraft aerodynamics. When surface is referred herein to as having increased camber, it means that the surface is curved to a greater degree, and when surface is referred to as having decreased camber, it means that the surface is curved to a lesser degree.

"Chord" generally refers to an imaginary straight line joining the leading edge and trailing edge (or spoke face) of an airfoil, such as a bicycle rim.

"Chord length" generally refers to the distance between the trailing edge (or spoke face) and the point on the leading edge where the chord intersects the leading edge.

"Curvature" generally refers to the amount or degree by which a geometric object deviates from being flat, or straight in the case of a line. A radius of curvature, R, of a curve at a point is a measure of the radius of the circular arc which best approximates the curve at that point. It should be recognized that at any intersection point along a curve of a two-dimensional cross-section, a line can be drawn that is tangent to the curve. The radius of curvature (R) at the point is then measured perpendicular to the tangency line. From the radius of curvature (R), the curvature (K) can be expressed using Equation 1 below, which in its simplest form it can be considered as the inverse of the radius of a circle.

$$K = \frac{1}{R} \qquad \text{Equation 1}$$

where:
$K$=Curvature
$R$=Radius of Curvature

"Rate of Change of Curvature or Gradient" generally refers to the difference in curvature or radius change over a given surface per curvilinear millimeter (mm). In a mathematical sense, the rate of change of curvature (or gradient) simply is a ratio of the change in curvature between two measurement points ($P_1$, $P_2$) and the curvilinear or travelling distance (L) between the two points ($P_1$, $P_2$). The rate of change of curvature or gradient ($\partial K$) can be represented by equation 2 below.

$$\partial K = \frac{(K_2 - K_1)}{L} \qquad \text{Equation 2}$$

where:
$\partial K$=Rate of change of curvature or gradient
$K_1$=Curvature at measurement point $P_1$
$K_2$=Curvature at measurement point $P_2$
L=Curvilinear or travelling distance between points $P_1$ and $P_2$.

"Rate of Change in the Rate of Change of Curvature or Gradient Derivative" generally refers to the difference in gradients or curvature changes over a given surface per curvilinear millimeter (mm). In a mathematical sense, the gradient derivative simply is a ratio of the change in the rate of change of curvature between two measurement points ($P_1$, $P_2$) and the curvilinear or travelling distance (L) between the two points ($P_1$, $P_2$). The rate of change in the rate of change of curvature or gradient derivative ($\partial K'$) can be represented by equation 3 below.

$$\partial K' = \frac{(\partial K_2 - \partial K_1)}{L} \qquad \text{Equation 3}$$

where:
$\partial K'$=Rate of Change in the Rate of Change of Curvature or Gradient Derivative
$\partial K_1$=Rate of change of curvature or gradient at point $P_1$
$\partial K_2$=Rate of change of curvature or gradient at point $P_2$
L=Curvilinear or travelling distance between points $P_1$ and $P_2$.

"Inflection Point" generally refers to a point on a curve at which the curve changes from being concave (e.g., concave downward) to convex (e.g., concave upward), or vice versa. In other words, it is a point on a curve at which the sign of the curvature (i.e., the concavity) changes. Using a second derivative test, an inflection point can occur where the second derivative of a function at a point equals zero the second derivative of the function on opposite sides of the point have opposite signs. In one example, the gradient derivative ($\partial K'$) at the inflection point has a value of zero and the gradient derivatives ($\partial K'$) at opposite sides of the point along the surface have opposite signs. While the reflexed portions along each sidewall are described as having two inflection points, it should be recognized that each sidewall can have more than two inflection points (or sometimes one) in other examples.

"Leading Edge" generally refers to one of two edges of the rim that holds the sidewall of the tire and forms part of the wheel bed securing the tire to the rim. The leading edge may take the form of a flange in the case of traditional "clincher" type wheels or may take the shape of a shallow lip that forms a cusp where the tire lies for tubular or sew-up rims. The leading edge can include a chamfer, bevel, and/or other surface contouring that transitions or blends the leading edge into the sidewall of the rim. When described and/or claimed herein, the leading edge should be considered to end after this chamfer, bevel, and/or contouring that transitions into the sidewall of the rim. For instance, when the sidewall is described and/or claimed as having G3 continuity (or other surface continuity) from the leading edge, it means that G3 continuity starts after any chamfer, bevel, contouring, etc. that blends the leading edge with the sidewall.

"Reflex"; "Reflexed"; and "Reflexed shape" generally refer to where surfaces of an aerodynamic shape or airfoil curve back up, typically (but not always) near the trailing edge for either asymmetric or symmetric airfoil shapes. In more specific examples, these terms refer to the curvature of a surface of the rim where it curves back from a convex to a concave shape (and/or vice-versa) near the spoke face. As noted before, camber in aerodynamics generally refers to the asymmetry between surfaces of an airfoil. A camber line represents the halfway point between these surfaces (e.g., top and bottom surfaces) of the airfoil. An airfoil that is not cambered is typically considered a symmetric airfoil and has a camber line that is straight. The camber line for asymmetric airfoils is not straight (e.g., curved) because the halfway point between the surfaces varies along the length of the airfoil. In traditional aerodynamics, an airfoil where the camber line curves back up near the trailing edge is considered a reflexed camber airfoil. By their nature, reflexed camber airfoils are asymmetric under this narrow definition. Some of the rims described and illustrated herein have symmetric airfoil shapes with camber lines that are straight, and under this narrow traditional interpretation, these symmetric rims technically would not have reflexed camber lines. However, as used herein, these terms (i.e., reflex, reflexed shape, etc.) should be interpreted in a broader sense to refer the shape when viewed along one side of the rim. For instance, each of these sidewall surfaces of these symmetric rims should be individually viewed as forming a camber line with an opposing flat surface (or other surface) so as to form an asymmetric airfoil shape, thereby resulting in a camber line that would be considered to have a reflexed shape even under a traditional narrow view. In other words, although the rims described, illustrated, and/or claimed herein can have symmetric airfoil shapes, the surfaces of these rims in a broader sense under this definition are considered to have a reflexed shape because each of the surfaces of the rim curve back up near the spoke faces (i.e., trailing edge) of the rims. It should be also recognized that the above described reflexed blend portion feature can be incorporated into rims that have asymmetric airfoil shapes as well.

"Rim" generally refers to the outer portion of a wheel assembly that holds the tire (which represents the leading edge of an airfoil shape of the rim) on the outer surface and spokes through spoke holes of an inner surface (which then becomes the trailing edge of the airfoil shape).

"Sidewall" generally refers to the surface or side that extends from the leading edge to the spoke when describing a rim. For a tire, the term "sidewall" generally refers to the side or surface between the tread shoulder and the rim bead.

"Spoke Face" generally refers to the surface of the rim where a spoke of a wheel extends for attachment to the hub.

"Surface Continuity" or "Continuity Between Surfaces" generally refers to how smoothly the surfaces (lines or curves) connect to one another. Surface continuity can be characterized based on a number different levels or classes of continuity.

"G0 Continuity" or "Positional/Touching Continuity" occurs whenever the end positions of two curves or surfaces touch. With G0 continuity, the curves or surfaces can meet at an angle, thereby having sharp corners or edges.

"G1 Continuity" or "Tangential Continuity" requires the end vectors of the curves or surfaces to be parallel where they meet, thereby ruling out sharp edges. With G1 continuity, the curves or surfaces share a common tangent direction at the location where two curves or surfaces meet. To put it another way, G1 continuity means that the two curves not only touch, but they go the same direction at the point where they touch.

"G2 Continuity" or "Curvature Continuity" requires the end vectors to be of the same length and rate of length change. In other words, G2 continuity additionally requires that the curves (or surfaces) not only go the same direction when they meet, but also have the same radius (R) or curvature (K) that point where they meet.

"G3 Continuity" or "Curvature Acceleration Continuity" (or "Planar Acceleration Continuity") require an even a higher degree of continuity than G2 by adding another requirement to the continuity, planar acceleration. Curves that are G3 continuous touch (G0) go the same direction (G1), have the same radius or curvature (G2), and that radius (R) or curvature (K) is accelerating at the same rate where the curves or surfaces meet.

For these surface continuities, it should be appreciated that surfaces can include minor variations and still be considered to have G0, G1, G2, and/or G3 continuity. In other words, surfaces can deviate from being perfectly smooth, such as on the microscopic level, so as to still satisfy these continuity requirements. For example, these continuous surfaces can include blemishes, stippling, mold/relief marks, paint layers, decal layers, scuffs, minor reliefs/offsets, and the like.

"Wheel" generally refers to an outer circular rim that holds the tire along with the spoke and hub assembly; however, based on the embodiment described, a wheel and rim may be used herein interchangeably.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "fore", "aft", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:
1. An article of manufacture, comprising:
 a bicycle rim having a longitudinal axis, the bicycle rim including
  a leading edge,
  a spoke face that is convexly shaped, wherein the spoke face includes a spoke face blend point,
  a sidewall extending from the leading edge to the spoke face blend point, wherein the sidewall includes an arched portion that is convexly shaped, a reflexed blend portion, a sidewall inflection point disposed between the arched portion and the reflexed blend portion, wherein the arched portion of the sidewall extends from the leading edge to the sidewall inflection point, wherein the reflexed blend portion is disposed between the arched portion and the spoke face, wherein the reflexed blend portion has a reflexed shape, wherein the reflexed blend portion includes
  a spoke face inflection point located between the sidewall inflection point and the spoke face blend point,
  a concave blend portion that is concavely shaped extending from the sidewall inflection point and the spoke face inflection point, and
  a convex blend portion that is convexly shaped extending from the spoke face inflection point to the spoke face blend point, wherein the spoke face blend point is positioned axially inward relative to the longitudinal axis of the rim as compared to any part of the concave blend portion, and wherein the arched portion, the reflexed blend portion, and the spoke face have curvature acceleration (G3) continuity.

2. The article of claim 1, wherein:
the sidewall further includes an extended curved section that is convexly shaped to reduce drag; and
the reflexed blend portion is at least in part concavely shaped to blend the extended curved section with the spoke face.

3. The article of claim 2, wherein the extended curved section increases camber of the sidewall to provide lower pressure drag.

4. The article of claim 2, wherein:
the rim has a chord length that extends from the leading edge to an end of the spoke face; and
the extended curved section starts at a position that is at least 45% of the chord length from the leading edge.

5. The article of claim 1, wherein:
the rim has a chord length that extends from the leading edge to an end of the spoke face; and
the reflexed blend portion starts at a position that is at least 65% of the chord length from the leading edge.

6. The article of claim 1, wherein:
the rim has a chord length that extends from the leading edge to an end of the spoke face; and
the spoke face starts at a position that is at least 85% of the chord length from the leading edge.

7. The article of claim 1, wherein the rim at the leading edge has a width of at least 25 mm.

8. The article of claim 1, wherein the rim further includes a trip edge.

9. The article of claim 8, wherein the trip edge is located along the reflexed blend portion.

10. The article of claim 1, further comprising:
a bicycle wheel including
  the bicycle rim;
  one or more spokes extending from the spoke face; and
  a hub to which the spokes are secured.

11. The article of claim 10, further comprising:
a tire engaging the leading edge of the rim.

12. The article of claim 11, wherein the tire is a clincher tire having a width of at least 25 mm.

13. The article of claim 1, wherein the arched portion, the spoke face, and the reflexed blend portion have:
  a maximum rate of change of curvature less than 0.045 mm/mm; and
  a maximum rate of change in the rate of change of curvature less than 0.0276 mm/mm$^2$.

14. An article of manufacture, comprising:
a bicycle rim having a longitudinal axis, the bicycle rim including
  a leading edge,
  a spoke face that is convexly shaped, wherein the spoke face has a spoke face blend point,
  a sidewall having an arched portion that is convexly shaped and a reflexed blend portion, wherein the arched portion extends from the leading edge to the reflexed blend portion,
  wherein the reflexed blend portion is disposed between the arched portion and the spoke face blend point of the spoke face, wherein the reflexed blend portion has a reflexed shape,
  wherein the reflexed blend portion includes a concave blend portion that is concavely shaped disposed between the arched portion and the spoke face,
  wherein the spoke face blend point is positioned axially inward relative to the longitudinal axis of the rim as compared to any part of the concave blend portion, and
  wherein the sidewall with the reflexed blend portion has
    a maximum rate of change of curvature less than 0.045 mm/mm, and
    a maximum rate of change in the rate of change of curvature less than 0.0276 mm/mm$^2$.

15. The article of claim 14, wherein the arched portion, the reflexed blend portion, and the spoke face have curvature acceleration (G3) continuity.

16. The article of claim 14, wherein:
the sidewall further includes an extended curved section that is convexly shaped to reduce drag; and
the reflexed blend portion is at least in part concavely shaped to blend the extended curved section with the spoke face.

17. The article of claim 16, wherein the extended curved section increases camber of the sidewall to provide lower pressure drag.

18. The article of claim 16, wherein the concave blend portion extends from the extended curved section.

19. The article of claim 18, wherein the reflexed blend portion includes:
a convex blend portion extending between the concave blend portion and the spoke face, wherein the convex blend portion is convexly shaped.

20. The article of claim 19, wherein the reflexed blend portion includes:
a sidewall inflection point disposed between the extended curved section and the concave blend portion; and
a spoke face inflection point disposed between the concave blend portion and the convex blend portion.

21. The article of claim 18, wherein the concave blend portion has a curvilinear length of at least 5.0 mm and at most 20.0 mm.

22. The article of claim 18, wherein the concave blend portion has a curvilinear length of at least 7.5 mm and at most 13.0 mm.

23. The article of claim 14, wherein the sidewall has a sidewall radius from 50 mm to 600 mm.

24. The article of claim 14, wherein the spoke face has a radius of 2 mm or greater.

25. The article of claim 14, wherein the rim further includes a trip edge disposed along the reflexed blend portion.

26. The article of claim 14, wherein the reflexed blend portion includes at least two inflection points.

* * * * *